(12) United States Patent
Liao (10) Patent No.: US 8,525,415 B2
(45) Date of Patent: Sep. 3, 2013

(54) VEHICULAR LED LAMP MONITORING/CONTROLLING SYSTEM

(76) Inventor: Yun-Chang Liao, Kaohsiung (TW)

(*) Notice: Subject to any disclaimer, the term of this patent is extended or adjusted under 35 U.S.C. 154(b) by 241 days.

(21) Appl. No.: 13/090,302

(22) Filed: Apr. 20, 2011

(65) Prior Publication Data

US 2012/0248982 A1 Oct. 4, 2012

(30) Foreign Application Priority Data

Mar. 31, 2011 (TW) ................................. 100111324

(51) Int. Cl.
*B60Q 1/14* (2006.01)
*B60Q 1/00* (2006.01)

(52) U.S. Cl.
USPC .................................. 315/77; 315/82; 362/20

(58) Field of Classification Search
USPC .................... 315/77, 88, 80, 83, 82, 312, 314, 315/315, 318; 362/543, 20, 276
See application file for complete search history.

(56) References Cited

U.S. PATENT DOCUMENTS

| 5,491,383 | A | * | 2/1996 | Leiber et al. | 315/77 |
| 5,923,027 | A | * | 7/1999 | Stam et al. | 250/208.1 |
| 6,417,624 | B1 | * | 7/2002 | Ito et al. | 315/88 |
| 7,244,036 | B2 | * | 7/2007 | Murakami et al. | 362/20 |
| 7,857,486 | B2 | * | 12/2010 | Long et al. | 362/294 |
| 2004/0080273 | A1 | * | 4/2004 | Ito et al. | 315/77 |
| 2011/0112719 | A1 | * | 5/2011 | Marumoto et al. | 701/35 |

* cited by examiner

*Primary Examiner* — Daniel D Chang
(74) *Attorney, Agent, or Firm* — Alan Kamrath; Kamrath IP Lawfirm, P.A.

(57) ABSTRACT

A vehicular LED lamp monitoring/controlling system includes a vehicular LED lamp having first and second LEDs. A selection/control unit is connected to and controls separate activation of the first and second LEDs and is connected to a malfunction detecting unit that detects operation of the first and second LEDs. The second LED is activated when the first LED operates abnormally. A power control unit can send a control signal to the selection/control unit to control luminance of each of the first and second LEDs. A vehicle speed monitoring unit connected to the power control unit reads a speed of a vehicle on which the vehicular LED lamp is mounted. When the vehicle is moving, the first or second LED provides normal luminance. When the vehicle is not moving, the first or second LED provides reduced luminance.

11 Claims, 7 Drawing Sheets

VEHICULAR LED LAMP MONITORING/CONTROLLING SYSTEM

BACKGROUND OF THE INVENTION

The present invention relates to a vehicular LED (light-emitting diode) lamp monitoring/controlling system and, more particularly, to a monitoring/controlling system for use with an LED lamp for a vehicle, such as an automobile, to effectively control the working temperature of high-luminance LEDs in an acceptable range.

High-luminance LEDs are often utilized in road lamps, flashers, and vehicular lamps as a result of development of technology. However, the high working temperature of the LEDs causes light attenuation and accelerates deterioration of the chips, shortening the service life of the LEDs. Thus, illuminating equipment using LEDs is generally mounted on a heat dissipating plate or the like to lower the working temperature of the LEDs by heat exchange with air currents. The service life of the LEDs can be prolonged if the working temperature can be further reduced by other provisions.

Thus, a need exists for a novel monitoring/controlling system for effectively controlling the working temperature of high-luminance LEDs in an acceptable range.

BRIEF SUMMARY OF THE INVENTION

The present invention solves this need and other problems in the field of vehicular LED lamps by providing a vehicular LED lamp monitoring/controlling system including a vehicular LED lamp having a first LED and a second LED. A malfunction detecting unit is electrically and separately connected to the first and second LEDs. The malfunction detecting unit detects whether the first and second LEDs operate normally after the first and second LEDs are activated. A selection/control unit is electrically and separately connected to the first and second LEDs and separately controls activation of the first and second LEDs. The selection/control unit is electrically connected to the malfunction detecting unit. The second LED is activated when the malfunction detecting unit detects abnormal function of the first LED. A power control unit is electrically connected to the selection/control unit and capable of sending a control signal to the selection/control unit to control, luminance of each of the first and second LEDs. A vehicle speed monitoring unit is electrically connected to the power control unit and reads a speed of a vehicle on which the vehicular LED lamp is mounted.

When the speed of the vehicle is not equal to zero, the vehicle speed monitoring unit controls the power control unit to send the control signal to the selection/control unit to control the first or second LED to provide normal luminance.

When the speed of the vehicle is equal to zero, the vehicle speed monitoring unit sends a signal indicative that the vehicle is not moving to the power control unit, controlling the first or second LED to provide reduced luminance lower than the normal luminance.

In a form shown, the first and second LEDs emit light beams of a first color when activated. The vehicular LED lamp further includes a third LED electrically connected to the selection/control unit. The selection/control unit controls activation of the third LED to emit light beams of a second color different from the first color. An external humidity detecting unit is electrically connected to the selection/control unit and detects an ambient relative humidity surrounding the vehicle. The external humidity detecting unit sends a signal to the selection/control unit to activate the third LED when the ambient relative humidity is in a range between 90% and 100%. A temperature detecting unit is electrically connected to the selection/control unit or the malfunction detecting unit. The temperature detecting unit detects a working temperature of the vehicular LED lamp and is capable of setting a safe temperature. A heat dissipating unit is electrically connected to the selection/control unit. When the working temperature of the vehicular LED lamp detected by the temperature detecting unit is higher than or equal to the safe temperature, the temperature detecting unit sends a signal to the selection/control unit to drive the heat dissipating unit, proceeding heat dissipation of the vehicular LED lamp. A mandatory activation switch is electrically connected to the vehicle speed monitoring unit. The mandatory activation switch is manually operable to deactivate the vehicle speed monitoring unit, causing the first or second LED to provide the normal luminance when the speed of the vehicle is equal to zero. The vehicular LED lamp includes a lamp base having a mounting seat and a heat pipe. The mounting seat includes a plurality of annularly arranged faces each having a groove. A carrier plate is mounted in each of the grooves. Each of the carrier plates includes the first and second LEDs. The mounting seat includes an end having a receptacle. The heat pipe includes an end received in the receptacle. The heat dissipating unit includes a thermoelectric module coupled to the heat pipe. A display unit is electrically connected to and capable of reading data from the temperature detecting unit or the malfunction detecting unit. The display unit is electrically connected to and capable of reading data from the selection/control unit, the external humidity detecting unit, and the vehicle speed monitoring unit.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "front", "rear", "inner", "outer", "end", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
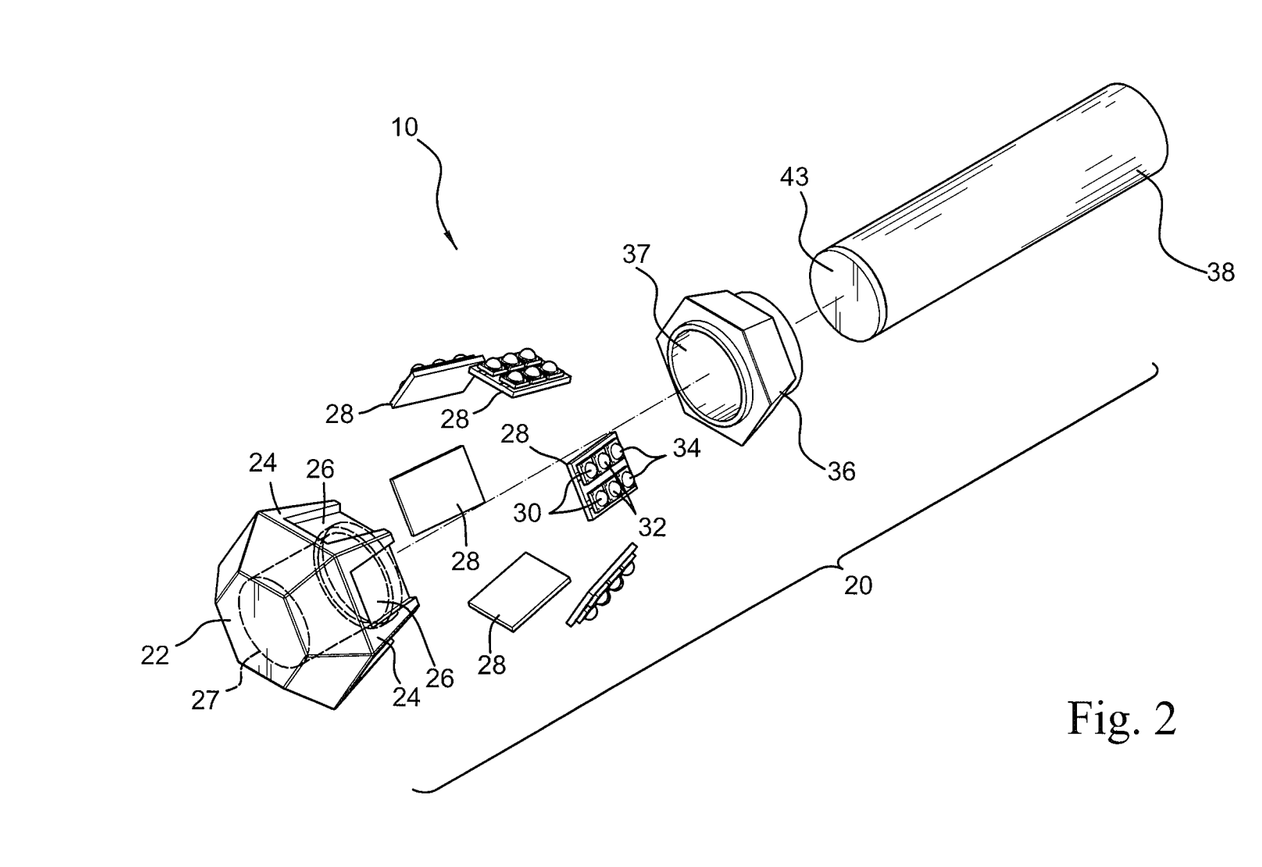
FIG. 2 shows a partial, exploded, perspective view of the vehicular LED lamp.
Figure 3:
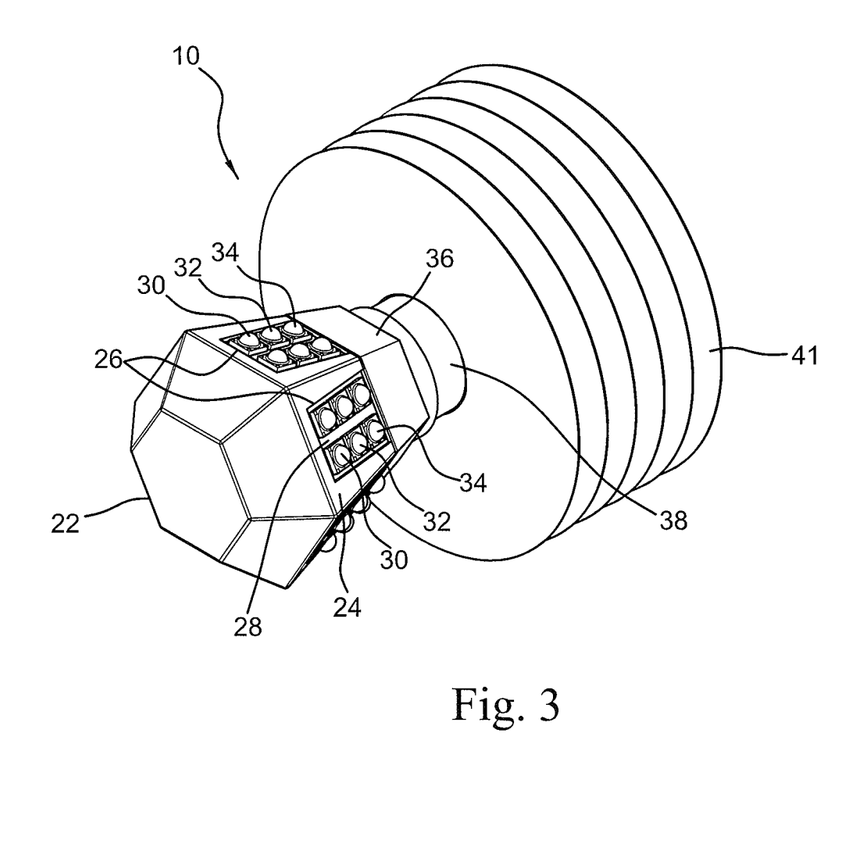
FIG. 3 shows a partial, perspective view of the vehicular LED lamp of FIG. 2 after assembly.
Figure 4:
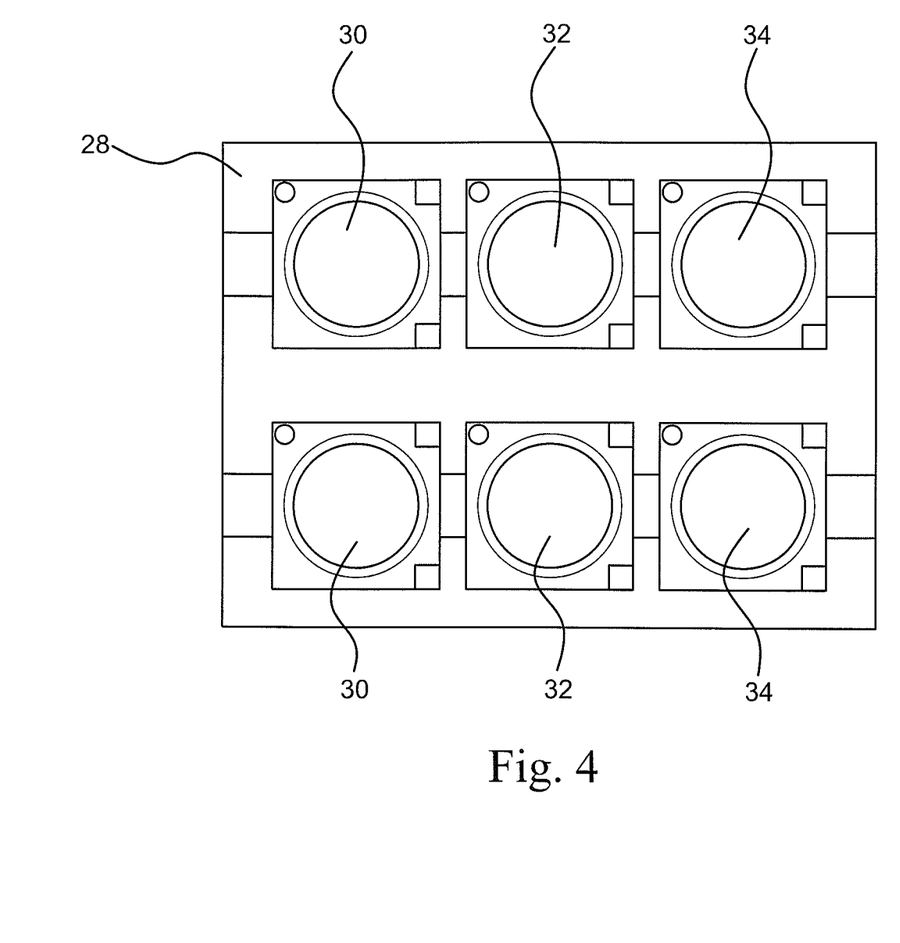
FIG. 4 shows an enlarged view of first, second, and third LEDs of the vehicular LED lamp of FIG. 3.

A vehicular LED lamp monitoring/controlling system according to the present invention is shown in the drawings and can be utilized with an LED lamp of a vehicle, such as an automobile, a motorcycle, or the like. Specifically, the vehicular LED lamp monitoring/controlling system includes a vehicular LED lamp 10 and a monitoring/controlling system 42. With reference to FIGS. 2-4, the vehicular LED lamp 10 includes a lamp base 20 having a mounting seat 22 made of heat conductive material. Mounting seat 22 includes a plurality of facets at a front end thereof. Furthermore, mounting seat 22 includes six faces 24 at a rear end behind the facets. Faces 24 are angularly arranged and adjoin each other. Each face 24 includes a groove 26 receiving a heat-conductive carrier plate 28. Mounting seat 22 further includes a receptacle 27 in the rear end. Faces 24 surround receptacle 27. Two first LEDs 30, two second LEDs 32, and two third LEDs 34 are mounted on each carrier plate 28. Namely, each carrier plate 28 has six LEDs 30, 32, and 34. First and second LEDs 30 and 32 can emit white light beams. Third LEDs 34 can emit yellow light beams or light beams of a color other than that of first and second LEDs 30 and 32. However, yellow light beams are advantageous due to the high penetrating ability through the fog and rain.

In the form shown, lamp base 20 further includes a connecting seat 36 and a heat pipe 38. Connecting seat 36 includes a through-hole 37 and is mounted to the rear end of mounting seat 22 such as by screws. Heat pipe 38 receives a heat transfer medium including an aqueous solution containing at least one salt that includes a compound of an organic or inorganic acid and an ion of a metal selected from a group consisting of copper, silver, gold, nickel, chromium, zinc, titanium, cobalt and any combination thereof. Preferably, the pH value of the heat transfer medium is in a range between 6 and 10. Heat pipe 38 extends through through-hole 37 of connecting seat 36 and includes an engagement end 43 received in receptacle 27 of mounting seat 22. Thus, the heat generated by first, second, and third LEDs 30, 32, 34 can be transmitted through mounting seat 22 to heat pipe 38. Mounting seat 22 and connecting seat 36 can be coupled through threading coupling to provide carrier plates 28 with a stable status while allowing intimate contact between an inner periphery of receptacle 27 of mounting seat 22 and an outer periphery of heat pipe 38. In the form shown, heat pipe 38 further includes a plurality of fins 41 on the outer periphery thereof to increase the contact area between heat pipe 38 and the environment, enhancing the heat dissipating efficiency of first, second, and third LEDs 30, 32, and 34.

In the form shown, monitoring/controlling system 42 is mounted in the vehicle and electrically connected to the power supply of the vehicle for providing the power required for operation. Monitoring/controlling system 42 includes a selection/control unit 44 (FIG. 1) electrically and separately connected to first LEDs 30, second LEDs 32, and third LEDs 34. Specifically, each of first, second, and third LEDs 30, 32, and 34 and selection/control unit 44 forms an individual circuit, such that selection/control unit 44 can separately control on/off and the luminance of each of first, second, and third LEDs 30, 32, and 34.

Figure 1:
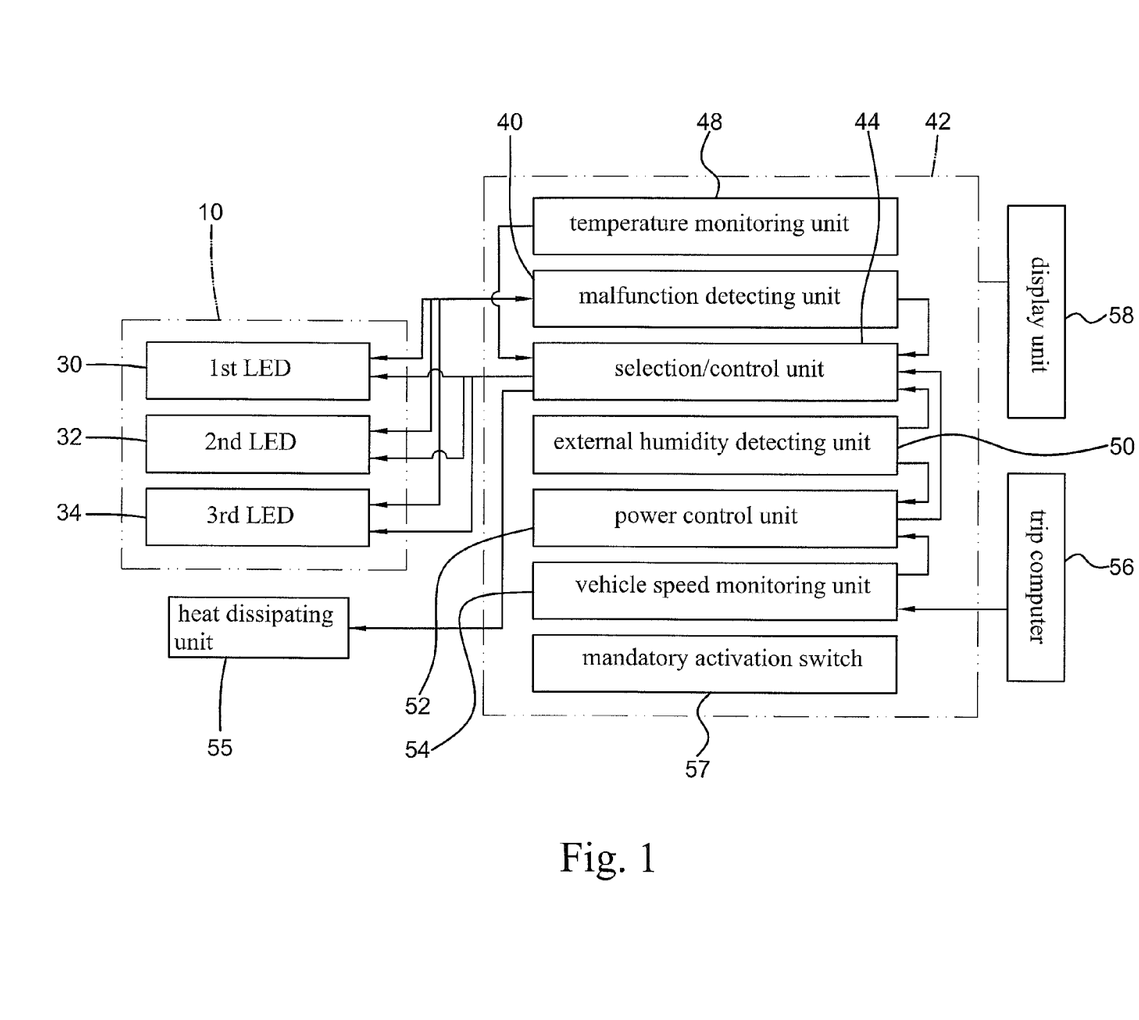
FIG. 1 shows a schematic block diagram illustrating connection between a monitoring/controlling system, a vehicular LED lamp, and a trip computer.

In the form shown, monitoring/controlling system 42 further includes a malfunction detecting unit 40 electrically connected to the selection/control unit 44. When either the power of the vehicle or vehicular LED lamp 10 is turned on, malfunction detecting unit 40 detects at least one of the voltage, electric current, and resistance of each of first LEDs 30, second LEDs 32, and third LEDs 34 to judge whether first, second, and third LEDs 30, 32, and 34 are damaged. It can be appreciated that malfunction detecting unit 40 and/or selection/control unit 44 can provide detection and/or recording of the working temperature of vehicular LED lamp 10 and/or first, second, and third LEDs 30, 32, and 34.

In the form shown, monitoring/controlling system 42 further includes a power control unit 52 and a vehicle speed monitoring unit 54. Power control unit 52 is electrically connected to selection/control unit 44. Vehicle speed monitoring unit 54 is electrically connected to power control unit 52. Furthermore, vehicle speed monitoring unit 54 is electrically connected to a trip computer 56 of the vehicle. Trip computer 56 can detect the speed and functions of the vehicle. Thus, vehicle speed monitoring unit 54 can identify whether the speed of the vehicle is larger than or equal to zero.

In the form shown, monitoring/controlling system 42 further includes an external humidity detecting unit 50 electrically connected to selection/control unit 44. External humidity detecting unit 50 detects the ambient relative humidity in the environment surrounding the vehicle to identify whether the environment is normal, foggy, or raining. It will become foggy when the relative humidity reaches 100%. Also, the relative humidity is 100% when it is raining. External humidity detecting unit 50 is electrically connected to power control unit 52, such that the luminance of vehicular LED lamp 10 can be increased when the ambient relative humidity detected by external humidity detecting unit 50 is in a range between 80% and 100%.

In the form shown, monitoring/controlling system 42 further includes a temperature monitoring unit 48 and a heat dissipating unit 55 including a fan or a thermoelectric module. Temperature monitoring unit 48 is electrically connected to selection/control unit 44 or malfunction detecting unit 40. Temperature monitoring unit 48 detects the working temperature of first, second, and third LEDs 30, 32, and 34 after activation and can set a safe temperature. Heat dissipating unit 55 is electrically connected to selection/control unit 44 and can proceed with heat dissipation for the working environment of vehicular LED lamp 10, fins 41, or heat pipe 38. Specifically, in a case that heat dissipating fan 55 is in the form of a fan facing the working environment of vehicular LED lamp 10 or fins 41, the air currents generated by rotating the fan carry the heat from the working environment of vehicular LED lamp 10 or fins 41. In another case that heat dissipating fan 55 is in the form of a thermoelectric module in contact with heat pipe 38, selection/control unit 44 can activate the thermoelectric module to lower the temperature of heat pipe 38. When the working temperature of first, second, and third LEDs 30, 32 and 34 reaches the safe temperature (which can be set to be in a range between 50° C. and 85° C.), temperature monitoring unit 48 outputs a heat dissipating signal to selection/control unit 44, which, in turn, activates heat dissipating unit 55 to proceed with heat dissipation for the working environment of vehicular LED lamp 10, fins 41, or heat pipe 38. In the case that heat dissipating unit 55 is in the form of a fan, the fan conveys low-temperature ambient air to dissipate heat from the working environment of vehicular LED lamp 10 or fins 41. When the working temperature of first, second, and third LEDs 30, 32 and 34 is below the safe temperature, temperature monitoring unit 48 outputs a stop signal to selection/control unit 44 to stop heat dissipating unit 55. Thus, the working temperature of first, second, and third LEDs 30, 32, and 34 can be controlled in an acceptable range.

In the form shown, monitoring/controlling system 42 is coupled to a display unit 58 to display the status (including the temperature, malfunction, voltage, power, etc.) of vehicular LED lamp 10. Namely, display unit 58 can read and display data of temperature monitoring unit 48 (or malfunction detecting unit 40), selection/control unit 44, external humidity detecting unit 50, power control unit 52, and vehicle speed monitoring unit 54. It can be appreciated that display unit 58 can be a separate unit or incorporated into a dashboard or liquid display in the vehicle. Specifically, display unit 58 is electrically connected to trip computer 56 and can include a plurality of indicator lamps and/or various vehicular information (such as digital display of the engine speed, the speed of the vehicle, the temperature of the cooling water, the indicator lamps for indicating on/off of the lamps of the vehicle, etc). Thus, display unit 58 can include indicator lamps to indicate on/off and malfunction of first, second, and third LEDs 30, 32, and 34 and/or various vehicular information to indicate the temperature, malfunction, and power of first, second, and third LEDs 30, 32, and 34, allowing the driver to know the status of first, second, and third LEDs 30, 32, and 34 through display unit 58. It can be appreciated that display unit 58 can be a part of trip computer 56 that displays damage of first, second, and third LEDs 30, 32, and 34 by malfunction codes.

Figure 5:
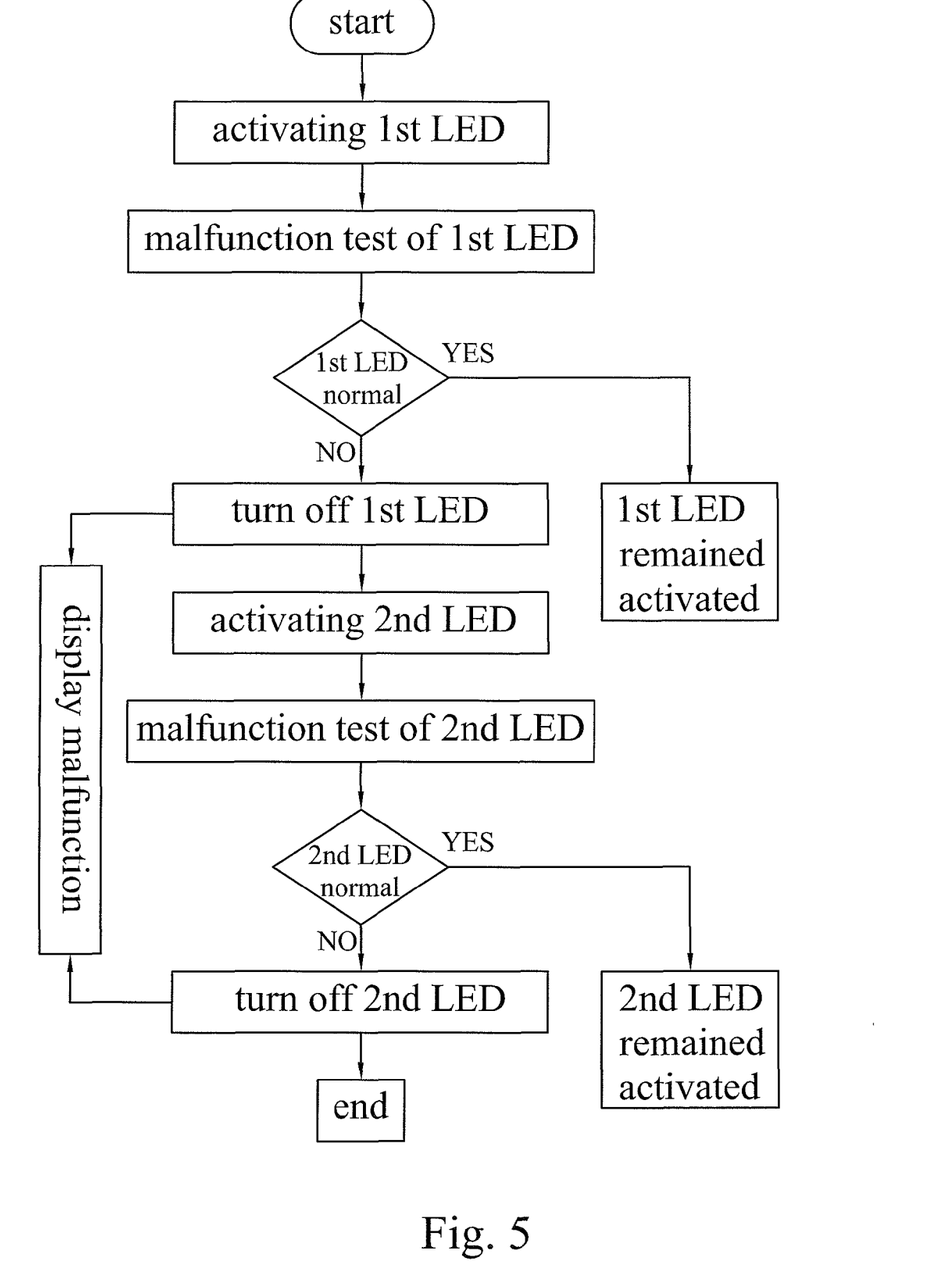
FIG. 5 shows a flowchart illustrating an example of operation of a malfunction monitoring unit of the monitoring/controlling system.

Now that the basic construction of the vehicular LED lamp monitoring/controlling system of the present invention has been explained, the operation and some of the advantages of the vehicular LED lamp monitoring/controlling system can be set forth and appreciated. In particular, for the sake of explanation, it will be assumed that vehicular LED lamp 10 is turned on after turning on the power of the vehicle or after starting the engine of the vehicle, selection/control unit 44 of monitoring/controlling system 42 firstly activates first LEDs 30. At the same time, malfunction detecting unit 40 detects whether first LEDs 30 malfunction. If first LEDs 30 operate normally, malfunction detecting unit 40 sends out a signal indicative of normal operation of first LEDs 30 to selection/control unit 44, and first LEDs 30 remain on. Furthermore, external humidity detecting unit 50 detects the ambient relative humidity when vehicular LED lamp 10 is turned on. First and third LEDs 30 and 34 are activated if the relative humidity is between 90 and 100%. On the other hand, if the relative humidity is smaller than 90%, only first LEDs 30 are activated. Note that the relative humidity threshold can be changed according to needs.

Furthermore, in a case that malfunction detecting unit 40 detects malfunction of first LEDs 30, malfunction detecting unit 40 sends out a signal indicative of malfunction of first LEDs 30 to selection/control unit 44. Selection/control unit 44 turns off the power supply circuit of first LEDs 30 and activates second LEDs 32. In a case that the relative humidity is between 90% and 100%, second and third LEDs 32 and 34 are turned on. Note that the relative humidity threshold can be changed according to needs. At the same time, malfunction detecting unit 40 detects whether second LEDs 32 malfunction. If second LEDs 32 operate normally, malfunction detecting unit 40 sends out a signal indicative of normal operation of second LEDs 32 to selection/control unit 44, and second LEDs 32 remain on. On the other hand. second LEDs 32 are turned off if they malfunction.

Furthermore, activation of first or second LEDs 30, 32 or deactivation of first or second LEDs 30, 32 due to malfunction is transmitted through selection/control unit 44 to trip computer 56 and can be displayed on display unit 58 to indicate the status (normal or malfunction) of first, second, and third LEDs 30, 32, and 34. The driver can repair damaged or malfunctioning first, second, and third LEDs 30, 32, and 34.

Figure 6:
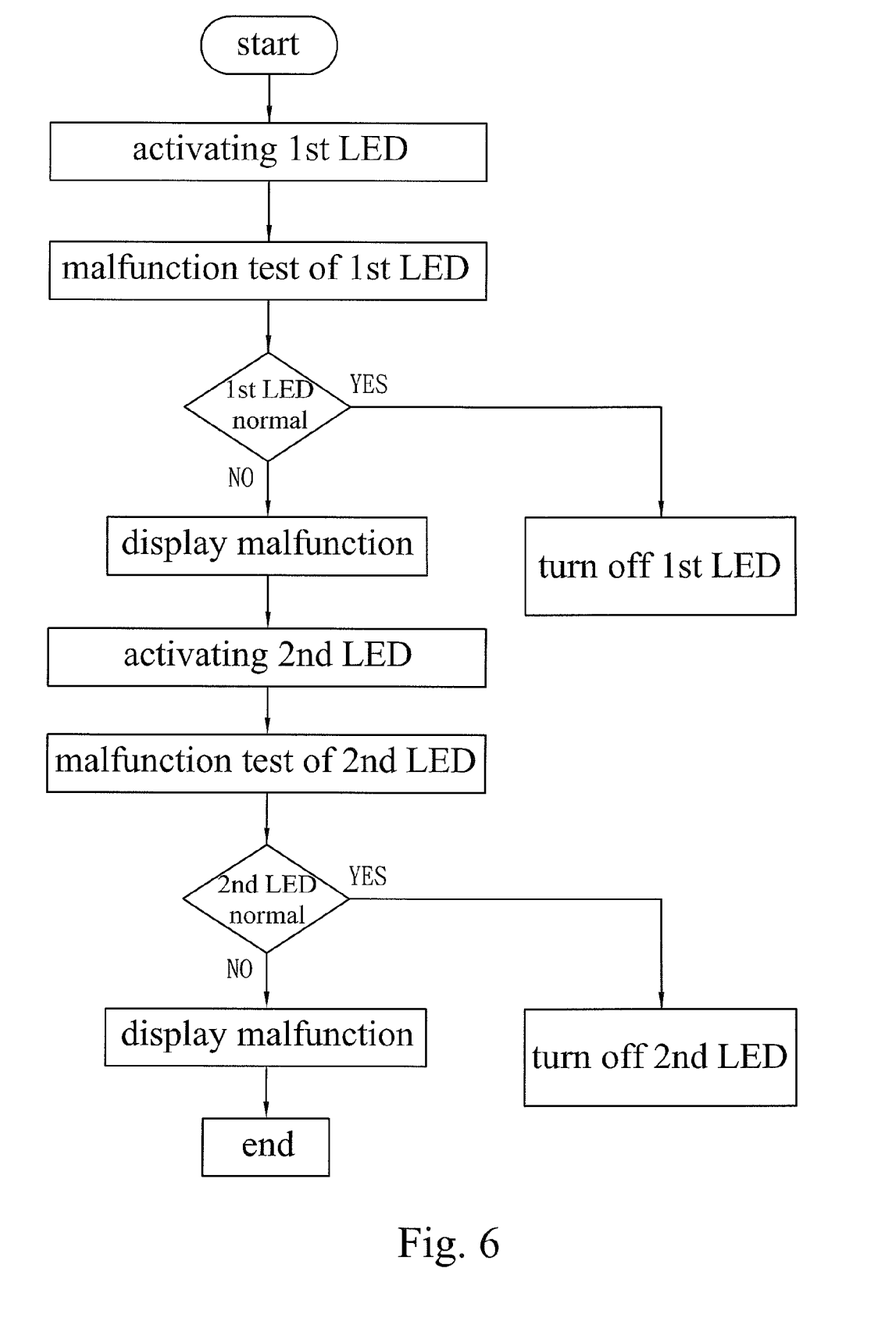
FIG. 6 shows another flowchart illustration another example of operation of the malfunction monitoring unit of the monitoring/controlling system.

With reference to FIG. 6, when the power of vehicle is turned on, malfunctioning detecting unit 40 can detect whether first, second, and third LEDs 30, 32, and 34 malfunction without activating first, second, and third LEDs 30, 32, and 34. Furthermore, external humidity detecting unit 50 does not detect the ambient relative humidity.

Figure 7:
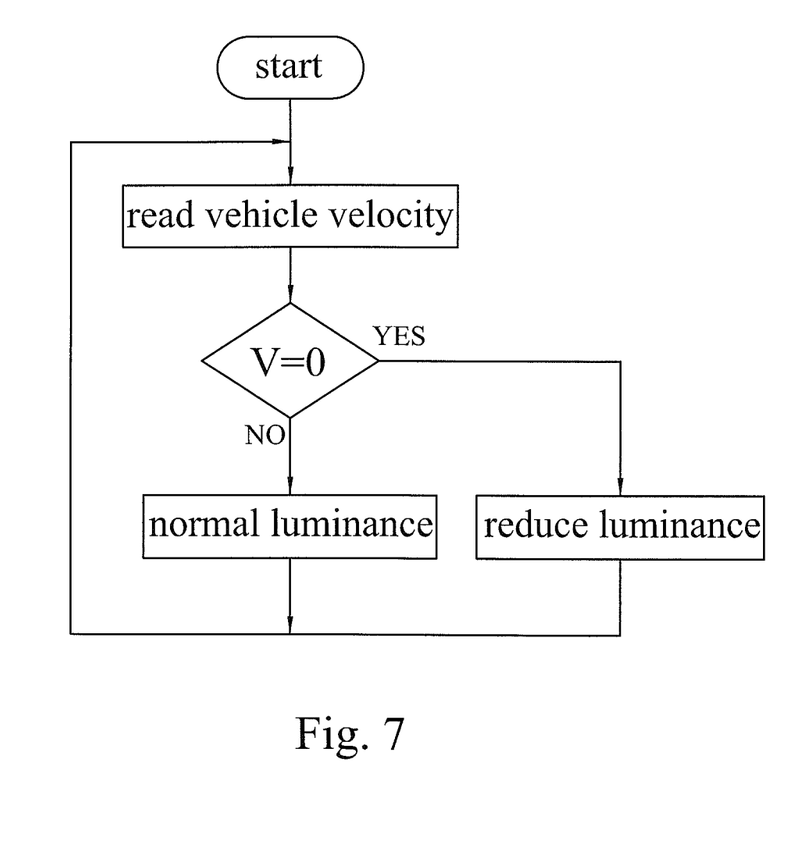
FIG. 7 shows a flowchart of monitoring the speed of a vehicle and of controlling the LEDs.

With reference to FIG. 7, in a case that vehicular LED lamp 10 is turned on while the driver is driving the vehicle, vehicle speed monitoring unit 54 reads the speed V of the vehicle from trip computer 56. When speed V of the vehicle is not equal to zero, vehicle speed monitoring unit 54 sends a signal indicative of the vehicle moving to power control unit 52. Power control unit 52 outputs a signal to selection/control unit 44, controlling first or second LEDs 30 or 32 to illuminate at normal luminance. On the other hand, when speed V of the vehicle is equal to zero, vehicle speed monitoring unit 54 sends a signal indicative that the vehicle is not moving to power control unit 52, which, in turn, sends a power-reducing signal to selection/control unit 44 to reduce the electric current or voltage supplied to first or second LEDs 30, 32, lowering the luminance of first or second LEDs 30, 32. Vehicle speed monitoring unit 54 can be coupled with a mandatory activation switch 57. When the vehicle is not moving and requires normal luminance, the driver can turn on mandatory activation switch 57, such that vehicular LED lamp 10 is not limited by vehicle speed monitoring unit 54 and that first, second, or third LEDs 30, 32, or 34 can maintain the normal luminance. When the vehicle is moving, mandatory activation switch 57 can be turned off to allow normal operation of vehicle speed monitoring unit 54. As an example, mandatory activation switch 57 can be in the form of a button that can be pressed to turn off vehicle speed monitoring unit 54 when the vehicle is not moving, providing normal luminance of first, or second LEDs 30 or 32. When the vehicle starts to move, mandatory activation switch 57 is pressed again to turn on vehicle speed monitoring unit 54.

By providing monitoring/controlling system 42, temperature monitoring unit 48 cooperates with heat dissipating unit 55 to lower the working temperature of vehicular LED lamp 10 after activation. Furthermore, the luminance of vehicular LED lamp 10 can be lowered when the vehicle is not moving, avoiding an increase in the working temperature of the vehicular LED lamp 10. Further, external humidity detecting unit 50 detects the ambient relative humidity to control activation of third LEDs 34 that emit yellow light beams, providing better illumination while driving in a foggy or rainy condition, further enhancing driving safety.

Now that the basic teachings of the present invention have been explained, many extensions and variations will be obvious to one having ordinary skill in the art. For example, the vehicular LED lamp monitoring/controlling system according to the present invention does not have to include temperature detecting unit 48 and heat dissipating unit 55. In this case, the working temperature of vehicular LED lamp 10 can be controlled in an acceptable range by air currents during movement of the vehicle through cooperation of heat pipe 38, fins 41, and the built-in heat dissipating system of vehicular LED lamp 10. Furthermore, the vehicular LED lamp monitoring/controlling system according to the present invention does not have to include external humidity detecting unit 50, and activation of third LEDs 34 can be manually controlled. As an example, the driver can turn on third LEDs 34 when the view is poor. Further, vehicular LED lamp 10 can include fewer or a larger number of first, second, and third LEDs 30, 32, and 34. As an example, vehicular LED lamp 10 can include one first LED 30, one second LED 32, and one third LED 34. Further, the vehicular LED lamp monitoring/controlling system according to the present invention does not have to include third LEDs 34, although the illuminated distance provided by first and second LEDs 30 and 32 is short due to low penetration. Further, the light beams emitted by first or second LEDs 30, 32 can be red, green, or blue. Further, display unit 58 can be replaced by malfunction codes in trip computer 56.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A vehicular LED lamp monitoring/controlling system comprising:
    a vehicular LED lamp including a lamp base, with the lamp base including a mounting seat and a heat pipe, with the mounting seat including a plurality of annularly arranged faces each having a groove, with a carrier plate mounted in each groove, with each carrier plate including a first LED and a second LED, with the mounting seat including an end having a receptacle, with the heat pipe including an end received in the receptacle;
    a malfunction detecting unit electrically and separately connected to the first and second LEDs on each carrier plate, with the malfunction detecting unit detecting whether the first and second LEDs on each carrier plate operate normally after the first and second LEDs on each carrier plate are activated;
    a selection/control unit electrically and separately connected to the first and second LEDs on each carrier plate, with the selection/control unit separately controlling activation of the first and second LEDs on each carrier plate, with the selection/control unit electrically connected to the malfunction detecting unit, with the second LED on at least one of the carrier plates activated by the selection/control unit when the malfunction detecting unit detects abnormal function of the first LED on a corresponding carrier plate;
    a temperature monitoring unit electrically connected to the selection/control unit or the malfunction detecting unit, with the temperature monitoring unit detecting a working temperature of the vehicular LED lamp, with the temperature monitoring unit setting a safe temperature;
    a heat dissipating unit electrically connected to the selection/control unit;
    a power control unit electrically connected to the selection/control unit, with the power control unit sending a control signal to the selection/control unit to control luminance of each of the first and second LEDs on each carrier plate; and
    a vehicle speed monitoring unit electrically connected to the power control unit, with the vehicle speed monitoring unit reading a speed of a vehicle on which the vehicular LED lamp is mounted,
    wherein when the working temperature of the vehicular LED lamp detected by the temperature monitoring unit is higher than or equal to the safe temperature, the temperature monitoring unit sends a signal to the selection/control unit to drive the heat dissipating unit, proceeding heat dissipation of the vehicular LED lamp,
    wherein when the speed of the vehicle is not equal to zero, the vehicle speed monitoring unit controls the power control unit to send the control signal to the selection/control unit to control the first or second LED on each carrier plate to provide normal luminance,
    wherein when the speed of the vehicle is equal to zero, the vehicle speed monitoring unit sends a signal indicative that the vehicle is not moving to the power control unit, controlling the first or second LED to provide reduced luminance lower than the normal luminance.

2. The vehicular LED lamp monitoring/controlling system as claimed in claim 1, with the first and second LEDs on each carrier plate emitting light beams of a first color when activated, with each carrier plate of the vehicular LED lamp further including a third LED, with the third LED on each carrier plate electrically connected to the selection/control unit, with the selection/control unit controlling activation of the third LED on each carrier plate to emit light beams of a second color different from the first color, with the vehicular LED lamp monitoring/controlling system further including an external humidity detecting unit electrically connected to the selection/control unit, with the external humidity detecting unit detecting an ambient relative humidity surrounding the vehicle, with the external humidity detecting unit sending a signal to the selection/control unit to activate the third LED on each carrier plate when the ambient relative humidity is in a range between 90% and 100%.

3. The vehicular LED lamp monitoring/controlling system as claimed in claim 1, further comprising:
    a mandatory activation switch electrically connected to the vehicle speed monitoring unit, with the mandatory activation switch manually operable to deactivate the vehicle speed monitoring unit, causing the first or second LED on each carrier plate to provide the normal luminance when the speed of the vehicle is equal to zero.

4. The vehicular LED lamp monitoring/controlling system as claimed in claim 3, with the mandatory activation switch being a button, with the vehicle speed monitoring unit deactivated when the button is pressed once, with the vehicle speed monitoring unit activated when the button is pressed twice.

5. The vehicular LED lamp monitoring/controlling system as claimed in claim 1, with the heat dissipating unit including a thermoelectric module coupled to the heat pipe.

6. The vehicular LED lamp monitoring/controlling system as claimed in claim 1, with the heat pipe receiving a heat transfer medium including an aqueous solution containing at least one salt, with said at least one salt including a compound of an organic or inorganic acid and an ion of a metal selected from a group consisting of copper, silver, gold, nickel, chromium, zinc, titanium, cobalt and any combination thereof.

7. The vehicular LED lamp monitoring/controlling system as claimed in claim 1, further comprising:
    a display unit electrically connected to and reading data from the temperature monitoring unit or the malfunction detecting unit, with the display unit electrically connected to and reading data from the selection/control unit, the external humidity detecting unit, and the vehicle speed monitoring unit.

8. The vehicular LED lamp monitoring/controlling system as claimed in claim 7, with the display unit including a dashboard of the vehicle.

9. The vehicular LED lamp monitoring/controlling system as claimed in claim 7, with the display unit including a liquid display mounted in the vehicle.

10. The vehicular LED lamp monitoring/controlling system as claimed in claim 7, with the display unit being a display of a trip computer mounted in the vehicle, with the malfunction detecting unit displayed on the display of the trip computer via malfunction codes of the trip computer.

11. The vehicular LED lamp monitoring/controlling system as claimed in claim 1, with the safe temperature being in a range between 50° C. and 85° C.

* * * * *